United States Patent
Kobayashi et al.

(10) Patent No.: US 7,911,576 B2
(45) Date of Patent: Mar. 22, 2011

(54) MANUFACTURING METHOD OF LIQUID CRYSTAL DISPLAY DEVICE

(75) Inventors: Setsuo Kobayashi, Mobara (JP); Hiroaki Miwa, Yokohama (JP); Katsuhiko Ishii, Chosei (JP); Takashi Yamamoto, Chiba (JP)

(73) Assignee: Hitachi Displays Ltd., Chiba (JP)

( * ) Notice: Subject to any disclaimer, the term of this patent is extended or adjusted under 35 U.S.C. 154(b) by 194 days.

(21) Appl. No.: 12/221,875

(22) Filed: Aug. 7, 2008

(65) Prior Publication Data

US 2009/0040452 A1 Feb. 12, 2009

(30) Foreign Application Priority Data

Aug. 7, 2007 (JP) ................... 2007-205356

(51) Int. Cl.
*G02F 1/1339* (2006.01)
(52) U.S. Cl. ........................ 349/153; 349/190
(58) Field of Classification Search ............... 349/153, 349/190
See application file for complete search history.

(56) References Cited

U.S. PATENT DOCUMENTS

| | | | |
|---|---|---|---|
| 2001/0033357 A1* | 10/2001 | Niwa et al. | 349/154 |
| 2003/0081155 A1* | 5/2003 | Moon et al. | 349/106 |
| 2005/0007540 A1* | 1/2005 | Tsuboi et al. | 349/158 |
| 2006/0028609 A1* | 2/2006 | Nakayoshi et al. | 349/153 |
| 2007/0098921 A1* | 5/2007 | Liang et al. | 428/1.5 |
| 2008/0259230 A1* | 10/2008 | Miyakita et al. | 349/8 |

FOREIGN PATENT DOCUMENTS

| | | |
|---|---|---|
| JP | HEI 05-5891 | 1/1993 |
| JP | HEI 05-241171 | 9/1993 |
| JP | 2001-337334 | 12/2001 |
| JP | 2007-86670 | 4/2007 |

* cited by examiner

*Primary Examiner* — Jerry Blevins
(74) *Attorney, Agent, or Firm* — Milbank, Tweed, Hadley & McCloy LLP

(57) ABSTRACT

The present disclosure relates to a manufacturing method of a liquid crystal display device. In one aspect, the method may include laminating two or more multipiece boards to each other by way of a sealing material, applying surface polishing to at least one of the multipiece boards using an etchant, and separating the multipiece boards into respective liquid crystal cells by cutting. In further aspects, the sealing material may include individual sealing materials which are formed on regions of the respective liquid crystal cells, an outer peripheral sealing material which surrounds the respective individual sealing materials and forms an opening at least in a portion thereof, and a weir sealing material of a pattern in which the weir sealing material is formed inside the outer peripheral sealing material and in the vicinity of the opening.

5 Claims, 10 Drawing Sheets

MANUFACTURING METHOD OF LIQUID CRYSTAL DISPLAY DEVICE

The present application claims priority from Japanese application JP2007-205356 filed on Aug. 7, 2007, the content of which is hereby incorporated by reference into this application.

BACKGROUND OF THE INVENTION

1. Field of the Invention

Aspects of the present invention relate to a manufacturing method of a liquid crystal display device, and more particularly to a manufacturing method of a liquid crystal display device which may laminate two or more multipiece boards by way of a sealing material, perform necessary treatment steps and separate the two or more multipiece boards into respective liquid crystal cells by cutting.

2. Description of the Related Art

A liquid crystal display device (panel) forms an envelope using a pair of substrates which are arranged to face each other by way of liquid crystal, wherein the liquid crystal is sealed by a sealing material which is also used for fixing the respective substrates.

A region surrounded by the sealing material may constitute a liquid crystal display region. Pixels may use the liquid crystal as one constitutional element and are formed in a matrix array on a liquid-crystal-side surface of each substrate in the region.

Further, such a liquid crystal display device has been manufactured recently using a method which is referred to as so-called multiple-cell manufacture or multiple-face manufacture for enhancing the efficiency of the manufacture.

That is, a pair of large-sized boards (multipiece boards) is prepared, and the constitution that is used for a region for forming each liquid crystal display device is applied to liquid-crystal-side surfaces of the respective large-sized boards.

Further, a sealing material (also referred to as an individual sealing material in some cases) is formed on the liquid-crystal-side surface of one large-sized board such that the sealing material surrounds at least the liquid crystal display region of each liquid crystal display device, another large-sized board is arranged to face one large-sized board by way of the sealing material, and the pair of large-sized boards is laminated to each other by curing the sealing material.

Then, by cutting the pair of large-sized boards, the large-sized boards are separated into a plurality of liquid crystal cells.

Here, in the lamination of the pair of large-sized boards, there may be a case in which a so-called gap adjustment step which sets an inter-space distance between the pair of large-sized boards to a fixed value, and a step which sets a thickness of at least one large-sized board out of the pair of large-sized boards to a predetermined thickness by surface polishing (chemical polishing) using an etchant before separation of the large-sized boards into the respective liquid crystal cells.

In such a case, before laminating the pair of large-sized boards, on the liquid-crystal-side surface of one large-sized board, in addition to the above-mentioned individual sealing material, a sealing material (also referred to as an outer peripheral sealing material in some cases) which surrounds the respective individual sealing materials and forms an opening in a portion thereof is formed.

In performing the above-mentioned gap adjustment, pressure inside the outer peripheral sealing material is reduced through the opening formed in the outer peripheral sealing material and, in performing the chemical polishing, the opening of the outer peripheral sealing material is sealed with a sealant thus preventing the intrusion of the etchant to the inside of the outer peripheral sealing material.

Such a manufacturing method of a liquid crystal display device is disclosed in JP-A-2001-337334 (patent document 1), for example. Another manufacturing method of a liquid crystal display device is disclosed in JP-A-5-5891 (patent document 2), for example. In the above-mentioned manufacturing method of a liquid crystal display device, when the opening of the outer peripheral sealing material is sealed with the sealant, there may be a case in which end surfaces of the pair of large-sized boards in the vicinity of the opening are covered with the sealant material and, further, the sealing material extends to and is adhered to surfaces of the pair of large-sized boards on a side opposite to a side where the outer peripheral sealing material is formed.

When a thickness of the large-sized board is decreased by applying surface polishing to at least one of the large-sized boards in such a state, the sealant which extends to and is adhered to the surface of the large-sized board on the side opposite to the side where the outer peripheral sealing material is formed remains in a state that the sealing material largely projects from the surface to which the surface polishing is applied.

When the pair of large-sized boards is placed on a base in a lying posture in such a state, the base and the projecting sealant come into contact with each other and hence, there arises a drawback that the large-sized board is easily broken due to a moment generated by such a contact.

In view of the above, there has been a demand for a technique which can, in sealing the opening formed in the outer peripheral sealing material using the sealant, form the sealant while preventing the sealant from covering end surfaces of the pair of large-sized boards thus obviating breaking of the respective large-sized boards.

Accordingly, it is an object of the present invention to provide a manufacturing method of a liquid crystal display device which can obviate breaking of two or more multipiece boards attributed to a sealant which may seal an opening formed in an outer peripheral sealing material.

To achieve the above-mentioned object, aspects of the present invention may use a sealing material which is referred to as a weir sealing material in this specification.

SUMMARY OF THE INVENTION

The present disclosure relates to a manufacturing method of a liquid crystal display device. In one aspect, the method may include laminating two or more multipiece boards to each other by way of a sealing material, applying surface polishing to at least one of the multipiece boards using an etchant, and separating the multipiece boards into respective liquid crystal cells by cutting. In further aspects, the sealing material may include individual sealing materials which are formed on regions of the respective liquid crystal cells, an outer peripheral sealing material which surrounds the respective individual sealing materials and forms an opening at least in a portion thereof, and a weir sealing material of a pattern in which the weir sealing material is formed inside the outer peripheral sealing material and in the vicinity of the opening. In further aspects, respective ends of the weir sealing material may be respectively bent in the direction of the outer peripheral sealing material present on both sides of the opening and are arranged close to or are connected to the outer peripheral sealing material. In further aspects, the surface polishing is performed in a state that the opening formed in the outer peripheral sealing material is sealed with a sealant.

The above-mentioned patent document 1 discloses no constitutional element which corresponds to such a weir sealing material. Although the patent document 2 discloses a sealing material (barrier 6) which may have the similar constitution, this sealing material is understood as a constitutional element which has a function completely different from that of the function of the weir sealing material disclosed herein.

Typical embodiments of the present invention are as follows:

(1) A manufacturing method of a liquid crystal display device is characterized in that in the manufacturing method of the liquid crystal display device including the steps of: laminating two ore more multipiece boards to each other by way of a sealing material; applying surface polishing to at least one of multipiece boards using an etchant; and separating the multipiece boards into respective liquid crystal cells by cutting. The sealing material may include individual sealing materials which are formed for regions of the respective liquid crystal cells, an outer peripheral sealing material which surrounds the respective individual sealing materials and forms an opening at least in a portion thereof, and a weir sealing material of a pattern in which the weir sealing material is formed inside the outer peripheral sealing material and in the vicinity of the opening. Respective ends of the weir sealing material may be respectively bent in the direction of the outer peripheral sealing material present on both sides of the opening and may be arranged close to or are connected to the outer peripheral sealing material. The surface polishing may be performed in a state that the opening formed in the outer peripheral sealing material is sealed with a sealant.

(2) In further aspects, the sealant before curing may be set to a value which falls within a range from about 2000 to about 5000 mPa·s.

(3) In further aspects, where the thickness of the multipiece board before the surface polishing is t2 and a projection width of the sealant which seals the opening formed in the outer peripheral sealing material in the thickness direction of the multipiece board as t1, the relationship of t1<t2 may be established.

(4) In further aspects, where the thickness of the multipiece board after the surface polishing as t3 and a projection width of the sealant which seals the opening formed in the outer peripheral sealing material in the thickness direction of the multipiece board is t1, the relationship of t1<t3 or t1=t3 may be established.

(5) A manufacturing method of a liquid crystal display device is characterized in that in the manufacturing method of the liquid crystal display device including the steps of: laminating two ore more multipiece boards to each other by way of a sealing material; applying surface polishing to at least one of the multipiece boards using an etchant; and separating the pair of multipiece boards into respective liquid crystal cells by cutting. The sealing material may include individual sealing materials which may be sealing materials formed for regions of the respective liquid crystal cells and are not provided with a liquid crystal sealing port, and an outer peripheral sealing material which may be a sealing material formed surrounding the respective individual sealing materials and is not provided with an opening. A gap between the multipiece boards may be adjusted by returning the gap from a pressure reduced state to an atmospheric state at the time of laminating the multipiece boards. An opening may be formed in the outer peripheral sealing material and the opening formed in the outer peripheral sealing material may be sealed with a sealant. The surface polishing may be performed in a state that the opening formed in the outer peripheral sealing material is sealed with the sealant.

(6) In further aspects, the opening formed in the outer peripheral sealing material may be formed by cutting the multipiece boards.

(7) In further aspects, the outer peripheral sealing material may be formed in a pattern having a trajectory which, in a portion of the outer peripheral sealing material where the opening is formed, gets over from one side to another side of a cutting line which forms cutting portions of the pair of multipiece boards and, thereafter, returns to the one side.

(8) A manufacturing method of a liquid crystal display device is characterized in that in the manufacturing method of the liquid crystal display device including the steps of: laminating two or more multipiece boards to each other by way of a sealing material, applying surface polishing to at least one of the multipiece boards using an etchant, and separating the multipiece boards into respective liquid crystal cells by cutting. The sealing material may include individual sealing materials which may be formed for regions of the respective liquid crystal cells, and an outer peripheral sealing material which surrounds the respective individual sealing materials and forms an opening at least in a portion thereof.

In further aspects, before applying the surface polishing to the multipiece board, the opening formed in the outer peripheral sealing material may be sealed by sucking a sealant having viscosity before curing within a range from about 125 to about 840 mPa·s into a gap formed between the multipiece boards.

(9) In further aspects, the opening formed in the outer peripheral sealing material may be sealed using the sealant remaining after wiping out a surplus amount out of the sealant sucked into the gap formed between the multipiece boards.

(10) In further aspects, the sucking of the sealant into the gap formed between the multipiece boards may be performed while lowering a temperature of the multipiece boards.

(11) The surface polishing step may be performed after the laminating step, the separating step may be performed after the surface polishing step, the opening-forming step may be performed after the gap-adjusting step, and the opening-forming step may be performed before the surface polishing step.

Here, the constitution of the present invention is not limited to the above, and various modifications can be made without departing from the technical concept of the present invention.

According to such a manufacturing method of a liquid crystal display device, it is possible to obviate breaking of the two or more multipiece boards attributed to the sealant which seals the opening formed in the outer peripheral sealing material.

DETAILED DESCRIPTION

Hereinafter, aspects of methods for manufacturing a liquid crystal display device according the present invention are explained in conjunction with drawings.

Figure 2:
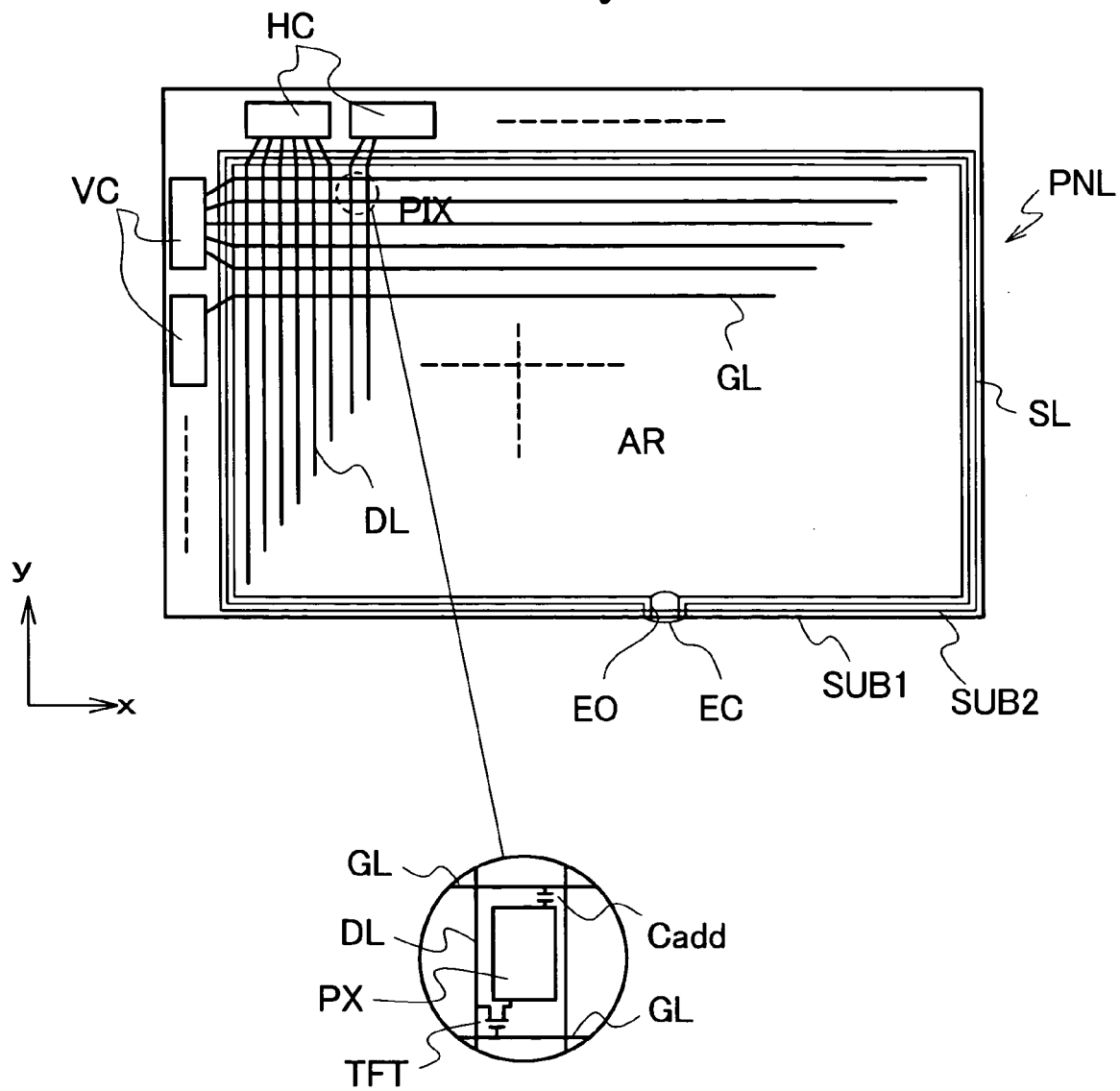
FIG. 2 is a schematic constitutional view showing one embodiment of a liquid crystal display device.

FIG. 2 shows a liquid crystal display panel PNL according to an aspect of the present invention. The liquid crystal display panel PNL may include a substrate SUB1 and a substrate SUB2 which are arranged to face each other in an opposed manner with liquid crystal (not shown in the drawing) sandwiched therebetween, and the substrate SUB1 and the substrate SUB2 may constitute an envelope.

The liquid crystal may be sealed by a sealing material SL which also may function as a member for fixing the substrate SUB2 to the substrate SUB1, and a region surrounded by the sealing material SL may form a liquid crystal display region AR. In further aspects, at liquid crystal display region AR, a liquid-crystal sealing port EO for filling and sealing the liquid crystal into a space inside the sealing material SL is formed in at least a portion of the sealing material SL. In further aspects, a sealant EC for sealing the liquid-crystal sealing port EO after filling and sealing the liquid crystal into the space inside the sealing material SL is provided.

In the liquid crystal display region AR, gate signal lines GL, which extend in the x direction and are arranged in parallel to each other in the y direction, and drain signal lines DL, which extend in the y direction and are arranged in parallel to each other in the x direction, may be formed on a liquid-crystal-side surface of the substrate SUB1.

In further aspects, a pixel may be formed in each region (pixel region) surrounded by two neighboring gate signal lines GL and two neighboring drain signal lines DL, and the respective pixels may be arranged in a matrix array within the liquid crystal display region AR.

An enlarged view (a view surrounded by a solid circular-line frame in the drawing) which shows a portion (a portion within a dotted circular-line frame in the drawing) indicated by a symbol PIX in the drawing as an equivalent circuit. In this view, for example, each pixel may include a thin film transistor TFT which may be turned on in response to signals (scanning signals) from the gate signal lines GL, a pixel electrode PX to which signals (video signals) from the drain signal lines DL may be supplied via the thin film transistor TFT in a turn-on state, and a capacitive element Cadd which is connected between the pixel electrode PX and another gate signal line GL in a state that the pixel electrode PX is sandwiched between the gate signal line GL for driving the thin film transistor TFT and another gate signal line GL, for example.

In further aspects, the capacitive element Cadd may be provided, when a video signal is supplied to the pixel electrode PX, for storing an electric charge of the signal for a relatively long time. Further, the pixel electrode PX may be configured to generate an electric field between a counter electrode (not shown in the drawing) which may be formed in common in the respective pixel regions on a liquid-crystal-side surface of the substrate SUB2 and the pixel electrode PX via the liquid crystal.

In this aspect, the substrate SUB1 is referred to as a TFT substrate. The gate signal lines GL, the drain signal lines DL, the thin film transistors TFT, the pixel electrodes PX and the like which are formed on the TFT substrate may be formed of a stacked body which may include a conductive layer, an insulation layer, a semiconductor layer and the like in a predetermined pattern formed by selective etching using a photolithographic technique.

In further aspects, the substrate SUB2 is referred to as a CF substrate. On a liquid crystal-side surface of the CF substrate, in addition to the above-mentioned counter electrode, a light blocking film (for example, black matrix), color filters, counter electrodes and the like may be formed. In such aspects, the light blocking film, color filters and counter electrodes may be formed of a stacked body including a conductive layer, an insulation layer and the like in a predetermined pattern formed by selective etching using a photolithographic technique.

In further aspects, the gate signal lines GL may have one ends thereof extended over the sealing material SL on left side of the drawing, for example, and may be connected to scanning signal drive circuits VC which may be mounted on a left-side peripheral portion of the substrate SUB1, wherein each scanning signal drive circuit VC is formed of a plurality of semiconductor devices.

In further aspects, the drain signal lines DL may have one ends thereof extended over the sealing material SL on an upper side of the drawing, for example, and may be connected to video signal drive circuits HC which may be mounted on an upper-side peripheral portion of the substrate SUB1, wherein each video signal drive circuit HC is formed of a plurality of semiconductor devices.

In such aspects, a liquid crystal display device to which the present invention is applicable is not limited to the liquid crystal display device having the above-mentioned pixel constitution. For example, the liquid crystal display device may have IPS (In Plane Switching) pixel constitution in which a pixel electrode and a counter electrode are formed in a pixel region on a substrate SUB1 side, and liquid crystal is driven by an electric field generated between the respective electrodes.

As shown in FIG. 2, one aspect of the present invention may include a liquid crystal display device that forms a liquid-crystal sealing port EO in the sealing material SL.

Figure 1:
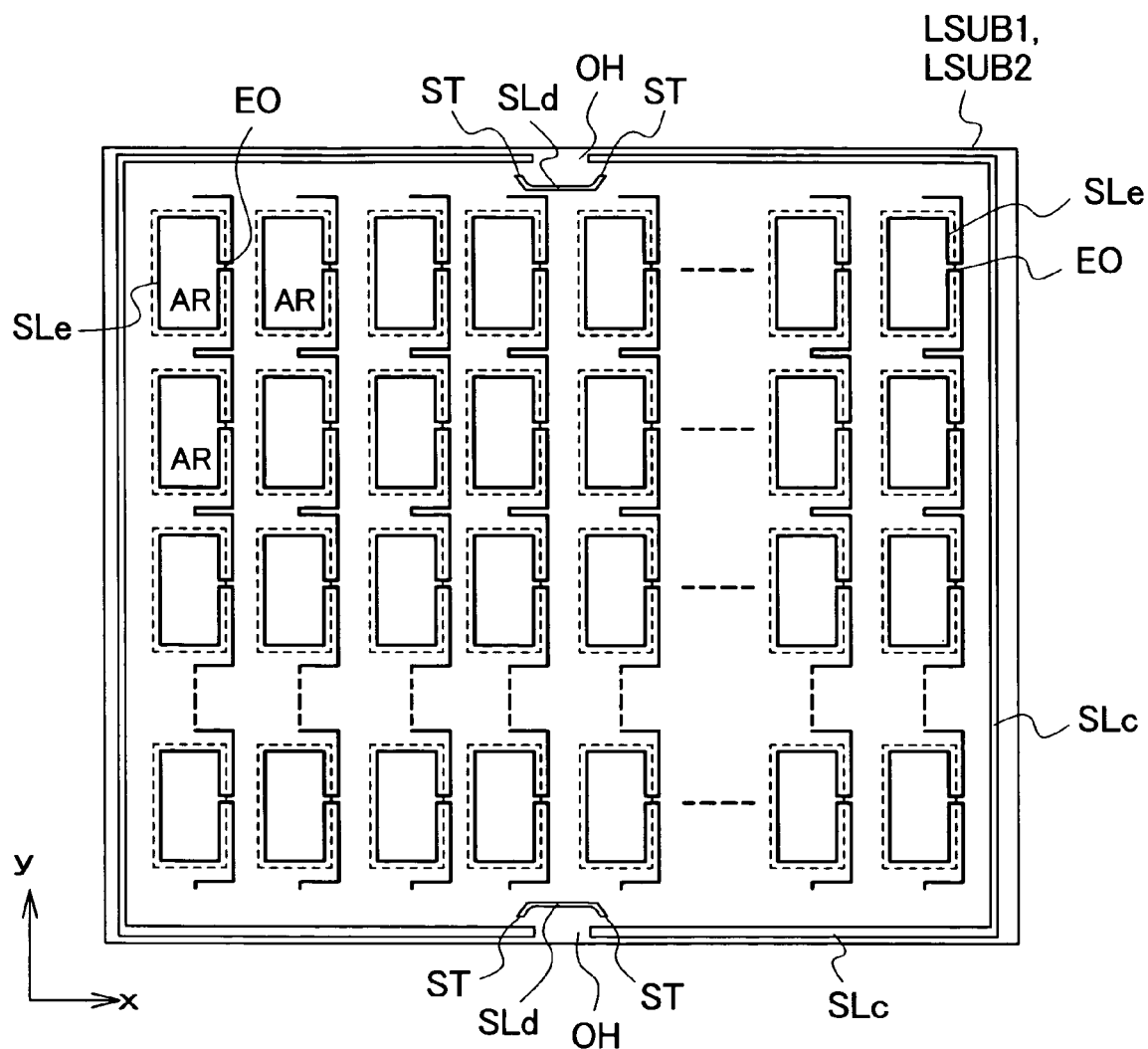
FIG. 1 is a plan view showing one embodiment of an intermediate product which is obtained during steps for manufacturing a liquid crystal display device according to aspects of the present invention.

As shown in FIG. 1, one aspect of the present invention may include an intermediate product which may be obtained during steps for manufacturing a liquid crystal display device.

In such aspects, the intermediate product may be in a multiple-cell stage before large-sized boards may be separated into individual liquid crystal display devices which are not filled with the liquid crystal (the separation into the respective liquid crystal cells). As shown in the perspective view of FIG. 1, one aspect of the present invention may include the stage in which large-sized board (a multipiece board) LSUB2 overlaps with large-sized board (a multipiece board) LSUB1 by way of a sealing material SL.

In further aspects, a portion where the individual liquid crystal display device is formed is indicated by a dotted-line frame in the drawing, and these portions are respectively arranged in parallel to each other in the x direction as well as in the y direction in the drawing.

In one example, large-sized board LSUB1 arranged on a back side in the drawing is referred to as a TFT board. Although not shown in the drawing, gate signal lines GL, drain signal lines DL, thin film transistors TFT, pixel electrodes PX and the like (as shown in FIG. 2 in aspects of the present invention) may be formed in every portion where the individual liquid crystal display device is formed.

In further aspects, large-sized board LSUB2 arranged on a face side in the drawing is referred to as the CF board. Although not shown in the drawing, the black matrix, the color filters, the counter electrodes and the like may be formed on every portion where the individual liquid crystal display device is formed.

In further aspects, with respect to at least either one of large-sized board LSUB1 and large-sized board LSUB2, on a surface of one large-sized board which faces another large-sized board in an opposed manner, sealing materials SL (hereinafter, also referred to as individual sealing materials SLe in some aspects) may be formed in a state that each individual sealing material which surrounds the liquid crystal display region AR is formed in the portion where the individual liquid crystal display device is formed. In further aspects, sealing material SL (hereinafter, also referred to as an outer peripheral sealing material SLc in some aspects) may be formed in a state that outer peripheral sealing material SLc surrounds the portions where the respective liquid crystal display devices are formed.

In further aspects, individual sealing materials SLe may be formed in the portions where the liquid crystal display devices are formed in a pattern in which liquid crystal sealing port EO is formed in a portion of the sealing material SLe when the large-sized board is divided into the respective liquid crystal display devices (the division into respective liquid crystal display cells).

In further aspects, individual sealing material SLe formed on the portion where the liquid crystal display device is formed may be continuously formed with individual sealing material SLe formed on the portion where another liquid crystal display device which is arranged in parallel to the liquid crystal display device in the y direction is formed. In such aspects, when individual sealing materials SLe are formed by a dispenser, individual sealing materials SLe of the respective liquid crystal display devices arranged in parallel to each other in the y direction may be formed in a short time with one stroke.

In further aspects, the outer peripheral sealing materials SLc which are formed to surround the portions where the respective liquid crystal display devices are formed are positioned at peripheral portions of large-sized boards LSUB1, LSUB2. In one example, opening portions OH may be formed in the substantially center portion of respective outer peripheral sealing materials SLc which extend in the x direction in the drawing.

In such aspects, opening portions OH formed in outer peripheral sealing materials SLc are provided for performing the gap adjustment between large-sized boards LSUB1, LSUB2. That is, the portions surrounded by outer peripheral sealing materials SLc and the portions surrounded by individual sealing materials SLe may be evacuated into a pressure reduced state or into a vacuum state through opening portion OH so that external pressure may be applied to large-sized boards LSUB1, LSUB2.

Figure 3A:
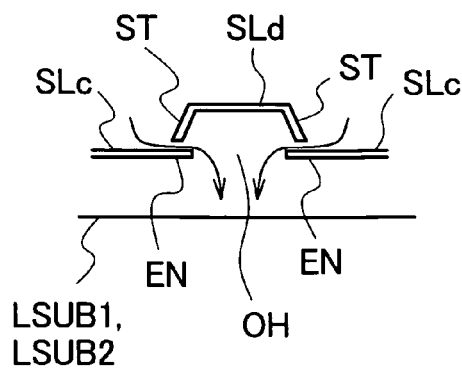
FIG. 3A to FIG. 3D are explanatory views showing one embodiment of the manufacturing method of the liquid crystal display device according to aspects of the present invention.
Figure 3B:
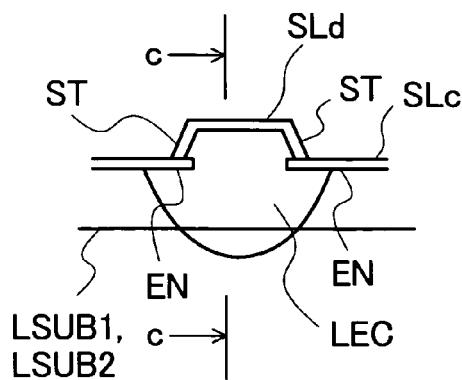
Figure 3C:
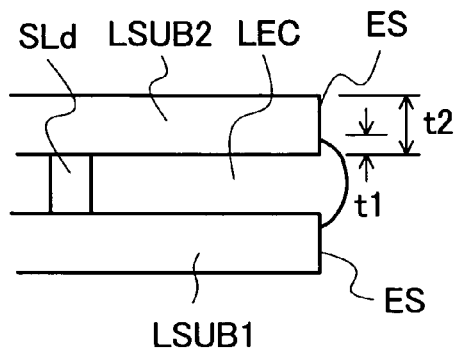
Figure 3D:
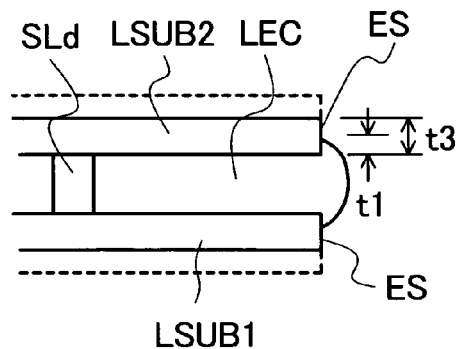

In further aspects, after gap adjustment between large-sized boards LSUB1, LSUB2 is performed, opening portions OH of sealing materials SLc may be sealed with a sealant LEC, as shown in FIGS. 3B to 3D according to aspects of the present invention, using a dispenser, for example, and a thickness of at least one of large-sized boards LSUB1, LSUB2 is set to a predetermined thickness (for example, 0.5 mm to 0.2 mm) by chemical polishing using a strong-acid etchant. In performing the chemical polishing, sealant LEC may prevent the etchant from intruding into the inside of the portion surrounded by the outer peripheral sealing materials SLc.

In one aspect, weir sealing materials SLd are formed on the boards simultaneously with formation of the outer peripheral sealing materials SLc, for example.

In further aspects, weir sealing materials SLd may be respectively arranged behind opening portions OH of outer peripheral sealing material SLc, and both end portions of weir sealing material SLd may be bent and extended so as to form extending portions ST which are arranged close to respective end portions of outer peripheral sealing materials SLc formed by the opening portions OH.

In further aspects, weir sealing material SLd may be formed inside outer peripheral sealing material SLc and in the vicinity of opening portion OH formed in outer peripheral sealing material SLc. In such aspects, both ends of weir sealing materials SLd are formed in a pattern in which both ends of weir sealing materials SLd are bent toward the outer peripheral sealing material SLc arranged on both sides of opening portions OH forming extending portions ST adjacent to outer peripheral sealing materials SLc.

In performing chemical polishing according to such aspects, when opening portions OH of outer peripheral sealing material SLc are sealed with the sealant LEC, there may exist a possibility that sealant LEC deeply intrudes into the space inside outer peripheral sealing material SLc. The pattern of such aspects, may be adopted for the purpose of preventing such intrusion by weir sealing material SLd. Due to such a constitution, sealant LEC may have a viscosity lower than the viscosity of a conventional sealant and may be selectively used.

As shown in FIG. 3A according to aspects of the present invention, at the time of applying weir sealing material SLd, respective extending portions ST of weir sealing materials SLd and end portions EN of outer peripheral sealing material SLc arranged on both sides of opening portion OH may not be connected with each other. In such aspects, air passages may be formed between weir sealing materials SLd and outer peripheral sealing material SLc. By evacuating the space inside outer peripheral sealing material SLc through the air passages (a flow passage of air indicated by an arrow in the drawing), the adjustment of the gap between large-sized boards LSUB1, LSUB2 may be performed.

In further aspects, at the time of performing the gap adjustment, as shown in aspects according to FIG. 3B, outer peripheral sealing material SLc and weir sealing materials SLd are collapsed. In such aspects, the widths of these materials are respectively increased whereby extending portions ST of weir sealing materials SLd and end portions EN of outer peripheral sealing material SLc may be connected with each other. In such aspects, the connection between extending portions ST of weir sealing materials SLd and end portions EN of outer peripheral sealing material SLc may not be a prerequisite, and it may be sufficient that distances between extending portions ST and end portions EN may be decreased. In such aspects, it may be sufficient that the connection can prevent sealant LEC from intruding into the inside of outer peripheral sealing material SLc using the extending portions of weir sealing materials SLd as weirs due to the subsequent application of sealant LEC. In further aspects, weir sealing materials SLd may be formed in the pattern in which weir sealing materials SLd include bent extending portions ST. In such aspects, weir sealing materials SLd may be formed into a shape suitable for receiving sealant LEC. Due to such a constitution, it may be possible to otherwise prevent sealant LEC from intruding into the space inside outer peripheral sealing material SLc in comparison to weir sealing materials SLd formed in a simple linear pattern.

In such aspects, by forming weir sealing materials SLd in such a manner as sealant LEC, sealant LEC, which may be made of a material having a viscosity lower than the viscosity of the conventional sealant, can be selectively used.

In one example, the viscosity of sealant LEC before curing may be set to a value which is within a range from 2000 mPa·s to 5000 mPa·s. In further examples, the viscosity of sealant LEC before curing may be set to 3000 mPa·s.

In other aspects, when the sealant having pre-curing viscosity of less than 2000 mPa·s is used, the sealant may excessively sag from a nozzle when applying the sealing material using a dispenser. In other aspects when the sealant having viscosity of more than 5000 mPa·s is used, the sealant may cover the end surfaces of respective large-sized boards LSUB1, LSUB2 arranged in the vicinity of opening portions OH of outer peripheral sealing material SLc. In further aspects, the sealant may extends to and may be adhered to surfaces of respective large-sized boards LSUB1, LSUB2 on a side opposite to the side on which outer peripheral sealing materials SLc are formed.

In aspects, when the sealant having such viscosity is selectively used as the sealant LEC, as shown in FIG. 3C according to aspects of the present invention (which is a cross-sectional view taken along a line C-C in FIG. 3B), it may be possible that a projection quantity of sealant LEC at end surfaces ES of respective large-sized boards LSUB1, LSUB2 arranged in the vicinity of opening portions OH of outer peripheral sealing material SLc may be made small. According to such aspects as shown in FIG. 3C, sealant LEC may not cover the entire area of end surfaces ES of large-sized boards LSUB1, LSUB2, but covers end surfaces ES by some projection quantity t1. In further aspects, assuming thicknesses of respective large-sized boards LSUB1, LSUB2 as t2, the relationship of t1<t2 may be established.

In further aspects, after forming sealant LEC, chemical etching may be performed for setting the thicknesses of large-sized boards LSUB1, LSUB2 to predetermined thicknesses respectively as described above. According to further aspects of the present invention as shown in FIG. 3D, assuming the predetermined thicknesses of respective large-sized boards LSUB1, LSUB2 as t3, the relationship of t1<t3 or t1=t3 may be established.

Figure 4A:
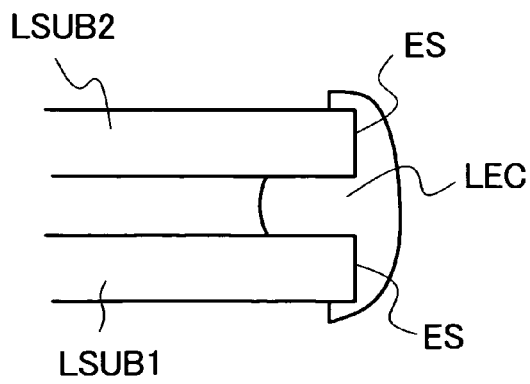
FIG. 4A and FIG. 4B are explanatory views showing drawbacks of a manufacturing method of a conventional liquid crystal display device.
Figure 4B:
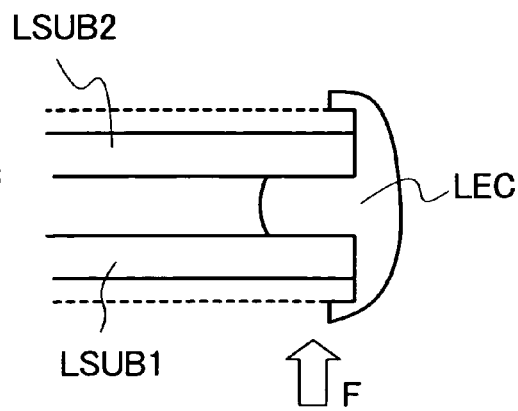

FIGS. 4A and 4B show examples of results that may occur when sealant LEC having high viscosity substantially equal to viscosity of the conventional sealant is used without forming weir sealing materials SLd.

As shown in FIG. 4A according to aspects of the present invention, when an opening (not shown in the drawing) of the outer peripheral sealing material is sealed with sealant LEC, sealant LEC covers end surfaces ES of respective large-sized boards LSUB1, LSUB2 arranged in the vicinity of the opening and, further, extends to and adheres to the surfaces on a side opposite to the surfaces of respective large-sized boards LSUB1, LSUB2 on which the outer peripheral sealing material (not shown in the drawing) is formed.

As shown in FIG. 4B according to further aspects, when the thicknesses of respective large-sized boards LSUB1, LSUB2 are decreased by applying the surface polishing to large-sized boards LSUB1, LSUB2 in such a state, sealant LEC—which extends to and adheres to the surfaces on a side opposite to the surfaces of large-sized boards LSUB1, LSUB2 on which the outer peripheral sealing material is formed—may remain in a projecting manner from the surfaces to which the surface polishing is applied.

In further aspects, when large-sized boards LSUB1, LSUB2 are placed on a base in a lying posture, the base and the sealant may come into contact with each other while generating a reaction force F. In such aspects large-sized boards LSUB1, LSUB2 may be broken due to such contact. In further aspects, the present invention may be also applicable to a liquid crystal display device in which individual sealing material SLe is formed into a closed annular shape without including liquid-crystal sealing port EO.

Figure 5:
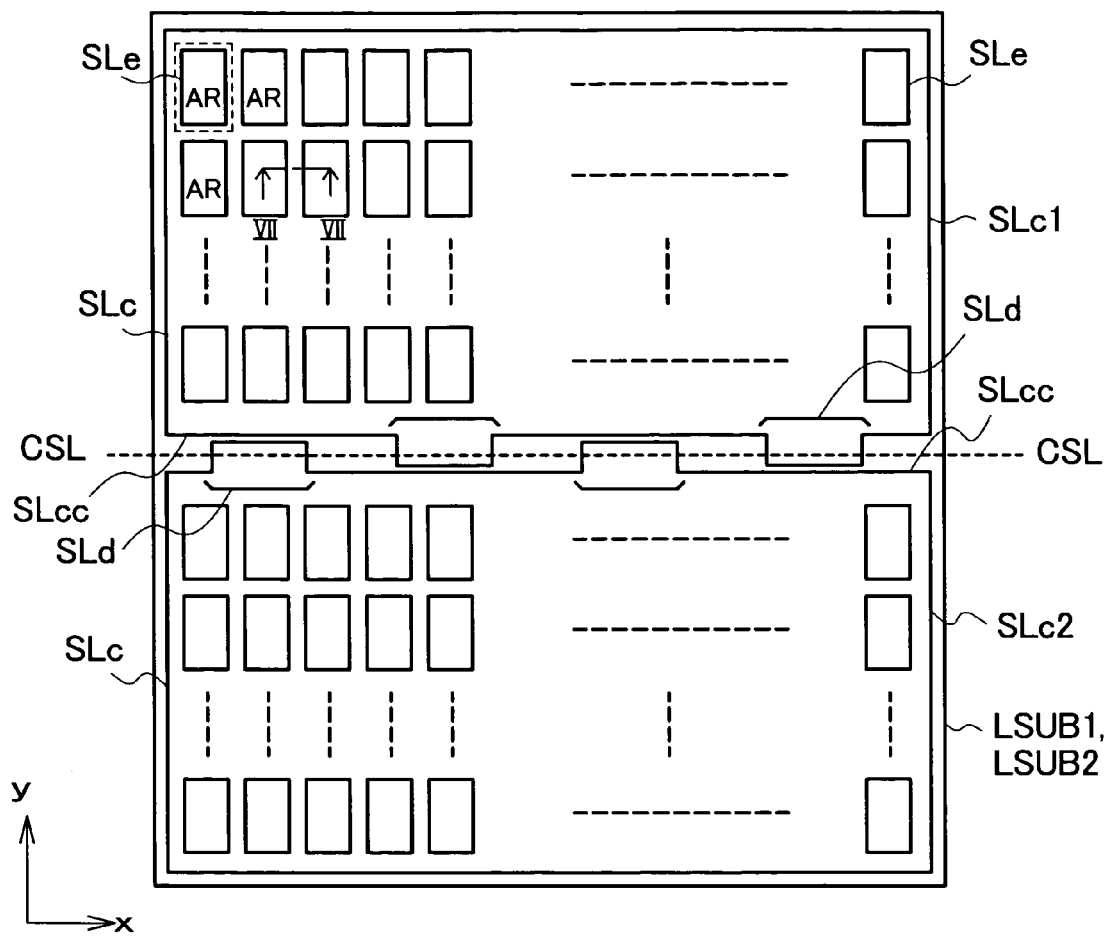
FIG. 5 is a plan view showing one embodiment of an intermediate product which is obtained during steps of the manufacturing method of the liquid crystal display device according to the present invention.
Figure 6:
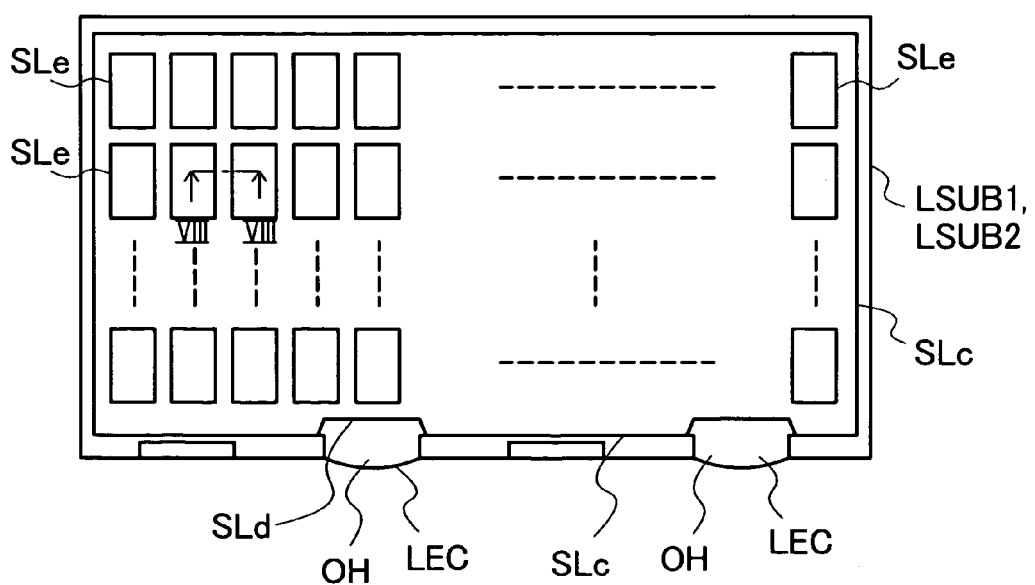
FIG. 6 is a plan view showing one embodiment of an intermediate product which is obtained during steps of the manufacturing method of the liquid crystal display device according to aspects of the present invention.

As shown in FIGS. 5 and 6, aspects of the present invention may include the manufacturing method of a liquid crystal display device forming no liquid-crystal sealing port in the sealing material.

As shown in FIG. 5, one aspect of the present invention may be shown via an intermediate product which is obtained during steps for manufacturing the liquid crystal display device, and corresponds to FIG. 1. In the same manner as the constitution shown in FIG. 1, portions where the respective individual liquid crystal display devices are formed are indicated by a dotted-line frame in the drawings, and these portions are respectively arranged in parallel to each other in the x direction as well as in the y direction to each other.

In one example, on large-sized board (multipiece board) LSUB1 arranged on a back side in the drawing, gate signal lines GL, drain signal lines DL, thin film transistors TFT, pixel electrodes PX and the like may be formed for every portion where the individual liquid crystal display device is formed, and on large-sized board (multipiece board) LSUB2 which is arranged on a front side in the drawing, a black matrix, color filters, a counter electrode and the like may be formed for every portion where the individual liquid crystal display device is formed.

In further aspects, with respect to at least either one of large-sized board LSUB1 and large-sized board LSUB2, on a surface of one large-sized board which faces another large-sized board in an opposed manner, sealing materials SL (hereinafter, also referred to as individual sealing materials SLe in some aspects) which may be respectively formed to surround liquid crystal display regions AR in the portions where the individual liquid crystal display devices are formed and sealing materials SL (hereinafter, also referred to as outer peripheral sealing materials SLc in some aspects) which are respectively formed to surround the portions where the respective liquid crystal display devices are formed. In further aspects, individual sealing materials SLe and outer peripheral sealing material SLc are indicated by solid lines having no width for the sake of brevity.

In such aspects, each individual sealing material SLe may be formed in a closed annular pattern, and liquid-crystal sealing port EO, as shown in FIG. 1 according to aspects of the present invention, is not formed in individual sealing material SLe. In such aspects, liquid crystal is filled by a liquid crystal dropping method. That is, as shown in FIG. 5 according to such aspects, liquid crystal LC is filled in portions surrounded by respective individual sealing materials SLe using a liquid crystal dropping method.

In further aspects, outer peripheral sealing materials SLc, which may be formed to surround the plurality of portions where the respective liquid crystal display devices are formed, may be respectively formed in a closed annular pattern, and opening portion OH (as shown in FIG. 1 according to aspects of the present invention) may not be formed in respective outer peripheral sealing materials SLc.

In such aspects, during the liquid-crystal dropping method, large-sized boards LSUB1, LSUB2 are laminated to each other using sealing material SL. This may occur after dropping liquid crystal and, thereafter, a space defined by large-sized boards LSUB1, LSUB2 and sealing material SL may be returned to an atmospheric pressure state from a pressure reduced state, and, in further aspects, from a vacuum state and, then, the gap adjustment may be performed due to the difference in pressure. In further aspects, a hermetical sealing system may be formed using outer peripheral sealing material SLc.

In further aspects, even when the opening portion is not formed in outer peripheral sealing material SLc as described above, weir sealing materials SLd having the substantially same pattern as weir sealing materials SLd (as shown in FIG. 1 according to aspects of the present invention) may be formed in the vicinity of outer peripheral sealing material SLc. In such aspects, opening portions (indicated by symbol OH as shown in FIG. 6 according to aspects of the present invention) may be formed in outer peripheral sealing material SLe in succeeding steps. In addition, the positional relationship between opening portions OH—which are formed as described above—and weir sealing materials SLd may become substantially equal to the positional relationship explained in conjunction with FIG. 1.

In further aspects, by undergoing the step of cutting the pair of laminated large-sized boards LSUB1, LSUB2 after performing the gap adjustment and before applying the chemical polishing to at least either one of large-sized boards LSUB1, LSUB2, opening portions OH may be formed in portions of outer peripheral sealing material SLc (in FIG. 5 according to aspects of the present invention, the boards may be cut along a dotted line indicated by symbol CSL). Opening portions OH may allow a portion (which is not filled with the liquid crystal LC) between individual sealing material SLe and another neighboring individual sealing material SLe to be communicable with atmospheric air. The reason for the communication between the portion and the atmospheric air is described below.

As shown in FIG. 5 according to aspects of the present invention, outer peripheral sealing material SLc (indicated by symbol SLc1 in the drawing) and outer peripheral sealing material SLc (indicated by symbol SLc2 in the drawing) may be respectively formed on an upper side and a lower side of the drawing, and a portion of outer peripheral sealing material SLc1 (indicated by symbol SLcc in the drawing) and a portion of outer peripheral sealing material SLc2 (indicated by symbol SLcc) may be arranged adjacent to each other at a portion where outer peripheral sealing material SLc1 and outer peripheral sealing material SLc2 may be arranged close to each other.

In further aspects, outer peripheral sealing material SLcc on a side of outer peripheral sealing material SLc1 may be arranged along and close to cutting scheduled line CSL of two or more laminated large-sized boards LSUB1, LSUB2. Outer peripheral sealing material SLcc may be arranged on one side of cutting scheduled line CSL. Outer peripheral sealing material SLcc may subsequently be arranged on another side of cutting scheduled line CSL. Outer peripheral sealing material SLcc may thereafter be arranged on one side of cutting scheduled line CSL. In such aspects, outer peripheral sealing material SLcc may be contiguously arranged in a zigzag manner. Outer peripheral sealing material SLcc on a side of outer sealing material SLc2 may also be arranged along and close to cutting scheduled line CSL and arranged on one side of cutting scheduled line CSL. In further aspects, outer sealing material SLcc on a side of outer sealing material SLc2 may be arranged on another side of cutting scheduled line CSL. In further aspects, outer sealing material SLcc on a side of outer sealing material SLc2 may be arranged on one side of cutting scheduled line CSL. Outer peripheral sealing material SLcc on outer sealing material SLc2 side may be contiguously arranged in a zigzag manner.

In further aspects, opening portions OH of outer peripheral sealing material SLc1 formed by cutting large-sized boards LSUB1, LSUB2 may form portions where outer peripheral sealing material SLc1 is arranged outside cutting scheduled line CSL, while opening portions OH of outer peripheral sealing material SLc2 may form portions where outer peripheral sealing material SLc2 is arranged outside cutting scheduled line CSL.

As shown in FIG. 5 according to aspects of the present invention, outer peripheral sealing material SLc may be formed by cutting large-sized boards LSUB1, LSUB2 once along cutting scheduled line CSL. In further aspects, the hermeticity of outer sealing materials SLc1, SLc2 attributed to respective outer sealing materials SLc1, SLc2 per se may be released simultaneously.

FIG. 6 shows one of the large-sized boards LSUB1, LSUB2 (upper side in the drawing) when laminated large-sized boards LSUB1, LSUB2 are cut along the cutting scheduled line CSL according to aspects of the present invention.

In further aspects, opening portions OH formed at the portions of outer peripheral sealing material SLc (SLcc) by cutting may be sealed using sealant LEC having relatively low viscosity (as shown in FIG. 1 according to aspects of the present invention), and the thickness of at least one of large-sized boards LSUB1, LSUB2 may be set to a predetermined thickness by chemical polishing.

In such aspects, in a similar as the constitution was explained in FIGS. 3C to 3D, sealant LEC may not cover the whole areas of end surfaces ES of large-sized boards LSUB1, LSUB2 and merely covers end surfaces ES by some projection quantity t1.

According to the above-mentioned manufacturing method of the liquid crystal display device explained in conjunction with FIG. 5 and FIG. 6, in addition to the advantageous effect which can be obtained with the provision of the weir sealing materials SLd, it is possible to obtain a second advantageous effect, described below, which can overcome the drawbacks of conventional techniques by performing the chemical polishing after cutting the large-sized boards LSUB1, LSUB2 along the cutting scheduled line CSL. In further aspects, during manufacture of the above mentioned liquid crystal display device, it may be unnecessary to provide weir sealing materials SLd if only the second advantageous effect is desired.

Figure 7A:
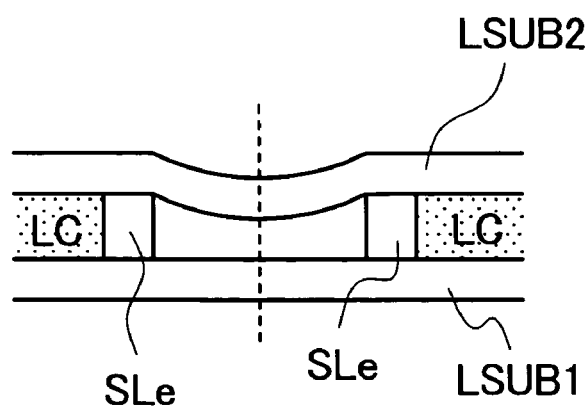
FIG. 7A and FIG. 7B are explanatory views showing drawbacks of the manufacturing method of the conventional liquid crystal display device.
Figure 7B:
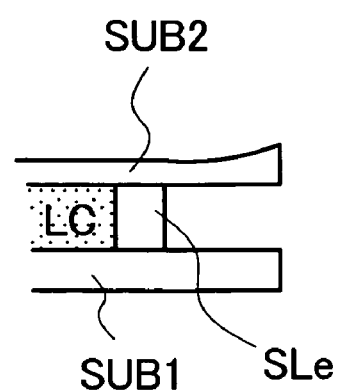

FIG. 7A and FIG. 7B are explanatory views showing chemical polishing performed without cutting the above-mentioned large-sized boards LSUB1, LSUB2 along the cutting scheduled line CSL.

When the cutting of large-sized boards LSUB1, LSUB2 along the above-mentioned cutting scheduled line CSL is not performed, (as shown in FIG. 7A which shows a cross section of a portion taken along a line VII-VII in FIG. 5), a portion of the gap between individual sealing material SLe and another neighboring individual sealing material SLe (which is not filled with the liquid crystal LC) may be held in a pressure reduced state. A warp may occur which is indented inwardly at a portion of at least one of large-sized boards LSUB1, LSUB2 corresponding to the above-mentioned portion of the gap.

When chemical polishing and succeeding mechanical polishing are performed, the portion of the large-sized board where the warp is generated may be formed with a thickness different from thicknesses of other portions of the large-sized board. When chemical polishing is performed, the convection of the etchant may be changed due to the above-mentioned deformation of the board so that the polishing thickness of the board differs among the portions of the board, while when the mechanical polishing is performed, polishing may be performed based on the parallelism of a platen so that polishing thickness of the board differs among the portions of the board.

When large-sized boards LSUB1, LSUB2 are divided into the respective individual liquid crystal display devices (the separation into the respective liquid crystal cells) (the separation portion being indicated by a dotted line as shown in FIG. 7A), as shown in FIG. 7B, boards SUB1, SUB2 may be formed with thicknesses different from each other at peripheries thereof, which may cause obstruction of the reduction of thickness of the liquid crystal display device.

Figure 8A:
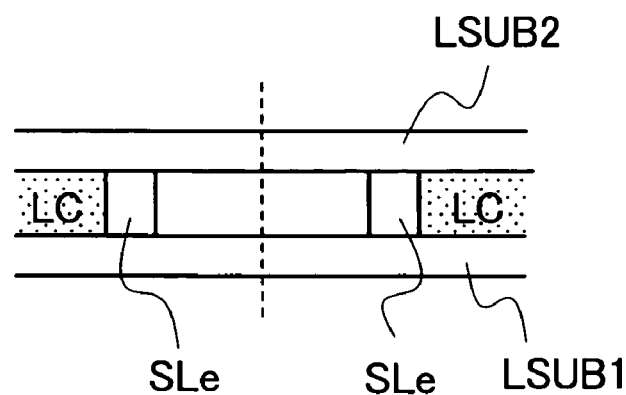
FIG. 8A and FIG. 8B are explanatory views of advantageous effects of the manufacturing method of the liquid crystal display device according to aspects of the present invention.
Figure 8B:
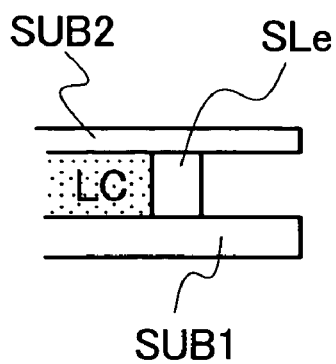

FIGS. 8A 8B are explanatory views showing chemical polishing performed after cutting the large-sized boards LSUB1, LSUB2 along the above-mentioned cutting scheduled line CSL. If cutting large-sized boards LSUB1, LSUB2 along the above-mentioned cutting scheduled line CSL, as shown in FIG. 8A (which shows a cross section of a portion taken along a line VIII-VIII in FIG. 6), a portion of the gap between individual sealing material SLe and another neighboring individual sealing material SLe (which is not filled with the liquid crystal LC) may be temporarily brought into a state in which the portion is communicated with atmosphere. After large-sized boards LSUB1, LSUB2 are sealed with sealant LEC, a warp may not be generated in large-sized boards LSUB1, LSUB2 and a planar state of large-sized boards LSUB1, LSUB2 may be held.

When chemical polishing and succeeding mechanical polishing are performed in such a state and large-sized boards LSUB1, LSUB2 are separated into the individual liquid crystal display devices (the cutting line being indicated by a dotted line in FIG. 8A), as shown in FIG. 8B, respective substrates SUB1, SUB2 may obtain uniform thicknesses.

As shown in FIG. 5 according to aspects of the present invention, one large-sized board LSUB1, LSUB2 is divided in two, for example, and chemical polishing may be applied to the respective divided boards. In such aspects, before cutting large-sized board LSUB1, LSUB2 along the cutting scheduled line CSL, closed (annular) outer peripheral sealing materials SLc1, SLc2 may be formed in each divided region.

Figure 9:
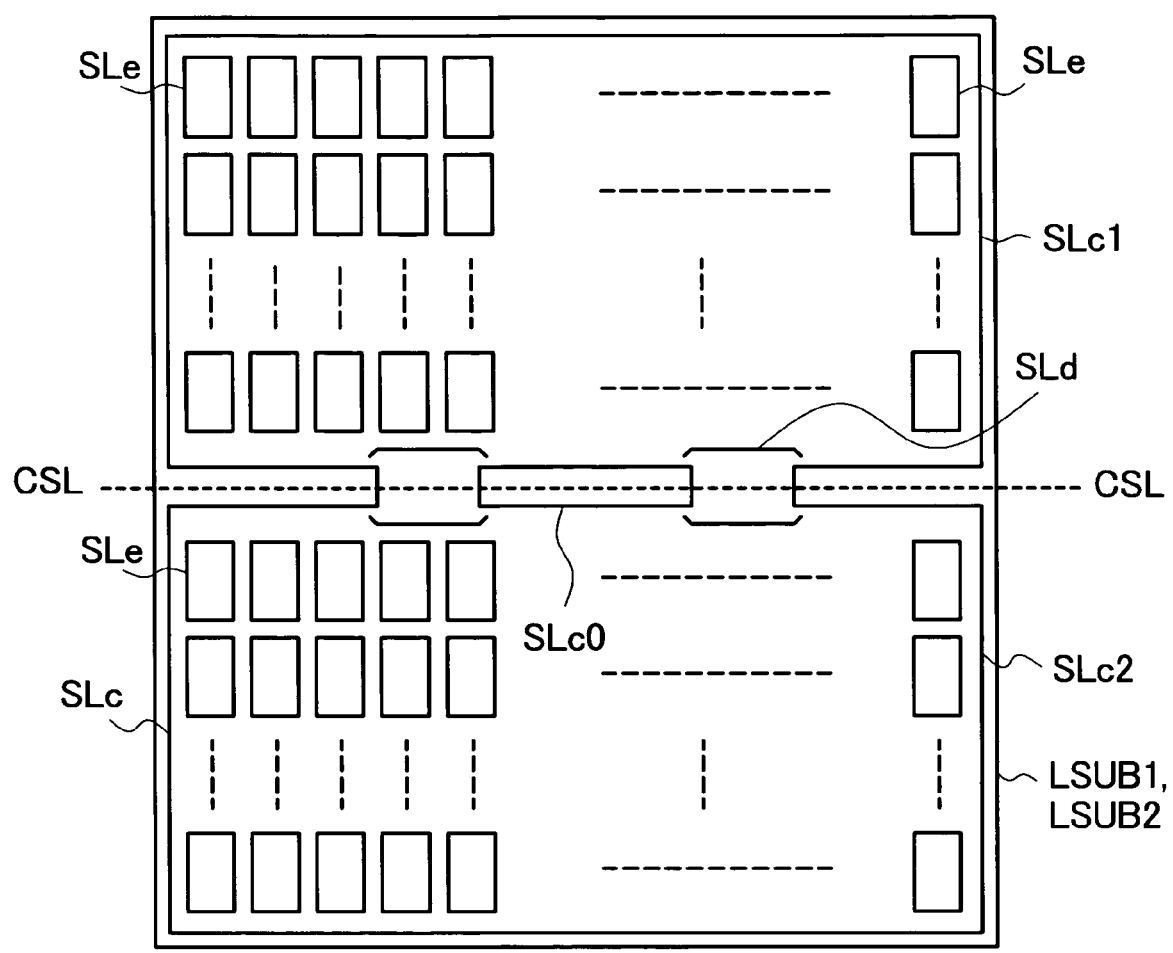
FIG. 9 is a plan view showing another embodiment of an intermediate product which is obtained during steps of the manufacturing method of the liquid crystal display device according to aspects of the present invention.

As shown in FIG. 9 (which corresponds to FIG. 5) according to aspects of the present invention, outer peripheral sealing material SLc1 (which is drawn above cutting scheduled line CSL in the figure) may be formed to reach outer peripheral sealing material SLc2 (drawn below cutting scheduled line CSL in the figure) while reaching a side portion of opening portion OH at a portion where opening portion OH is formed. In further aspects, outer peripheral sealing material SLc2 (which is drawn below cutting scheduled line CSL in the figure) may be formed such that outer peripheral sealing material SLc2 reaches outer peripheral sealing material SLc1 (drawn above cutting scheduled line CSL in the figure) while drawing a side portion of opening portion OH in the portion where another opening portion OH (being the same opening portion as above-mentioned opening portion OH when necessary) is formed.

In such aspects, when two opening portions OH are formed above the above-mentioned cutting scheduled line CSL, annular outer peripheral sealing material SLc (indicated by symbol SLc0 in the figure)—including a pattern which constitutes a side portion of another of two opening portions OH—is also formed.

Figure 10:
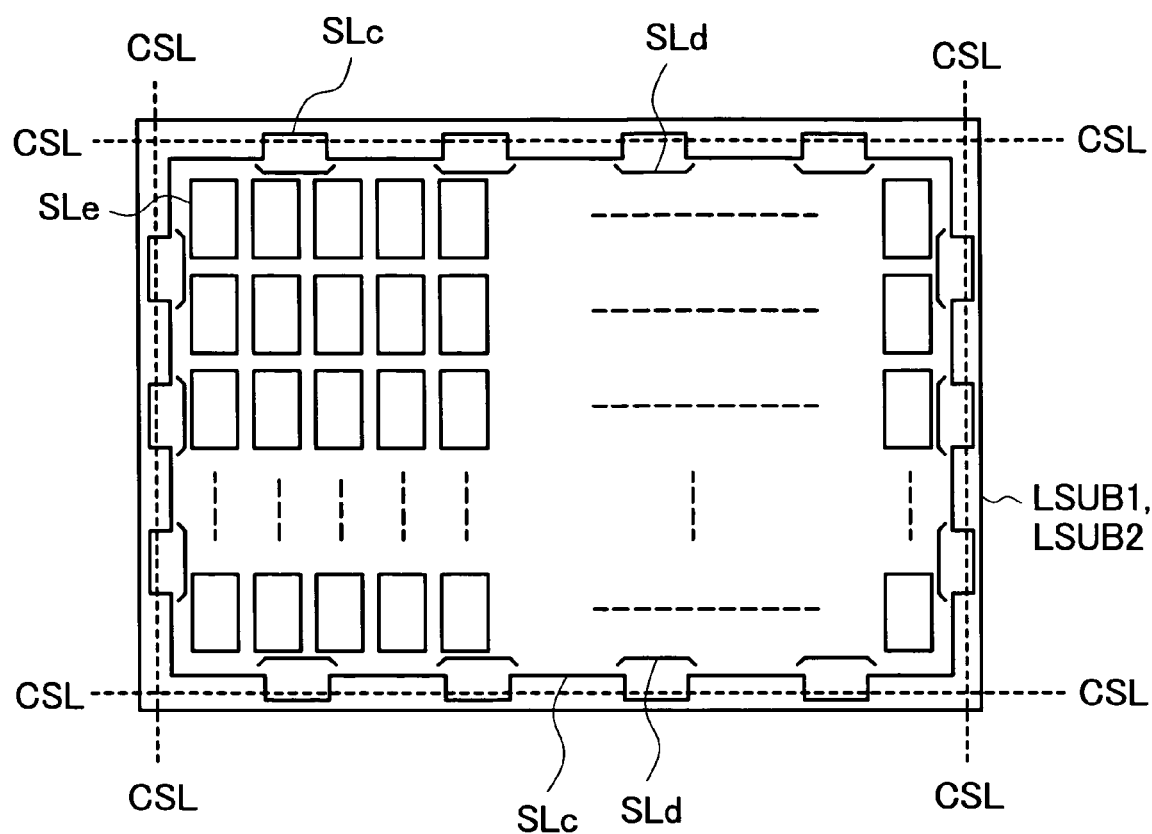
FIG. 10 is a plan view showing another embodiment of an intermediate product which is obtained during steps of the manufacturing method of the liquid crystal display device according to aspects of the present invention.

As shown in FIG. 10 according to aspects of the present invention, a positional relationship between cutting scheduled line CSL and outer peripheral sealing material SLc may exist when chemical polishing is performed without dividing one large-sized board LSUB1, LSUB2.

In such aspects, cutting scheduled line CSL may be set at four peripheral portions of large-sized board LSUB1, LSUB2. Outer peripheral sealing material SLc may be formed along and adjacent to above-mentioned cutting scheduled line CSL, wherein outer peripheral sealing material SLc is contiguously formed in a zigzag manner such that outer peripheral sealing material SLc is arranged on one side of cutting scheduled line CSL, outer peripheral sealing material SLc is arranged on another side of cutting scheduled line CSL, and outer peripheral sealing material SLc returns to one side of cutting scheduled line CSL.

In further aspects, opening portions OH formed in outer peripheral sealing material SLc which are formed by cutting large-sized boards LSUB1, LSUB2 form portions where outer peripheral sealing material SLc is positioned outside cutting scheduled line CSL. In such aspects, although FIG. 10 illustrates an example in which large-sized boards LSUB1, LSUB2 are cut at four peripheral portions, aspects are not limited to such an example. For example, large-sized boards LSUB1, LSUB2 may be cut at least at one peripheral portion.

Figure 11A:
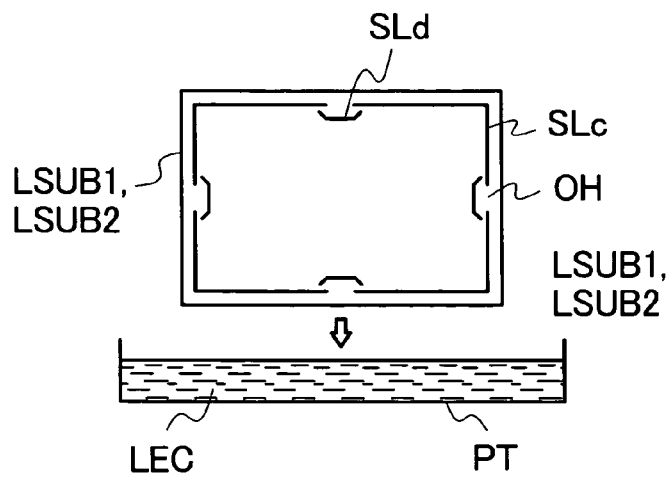
FIG. 11A to FIG. 11C are step views showing another embodiment of the manufacturing method of the liquid crystal display device according to aspects of the present invention.
Figure 11C:
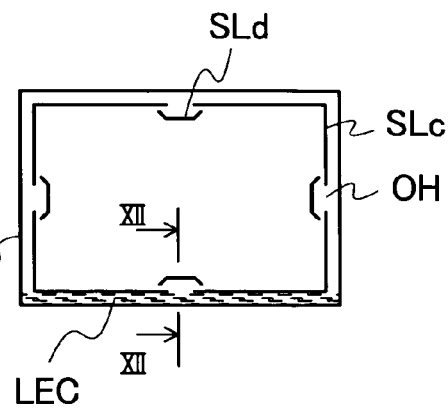
Figure 11B:
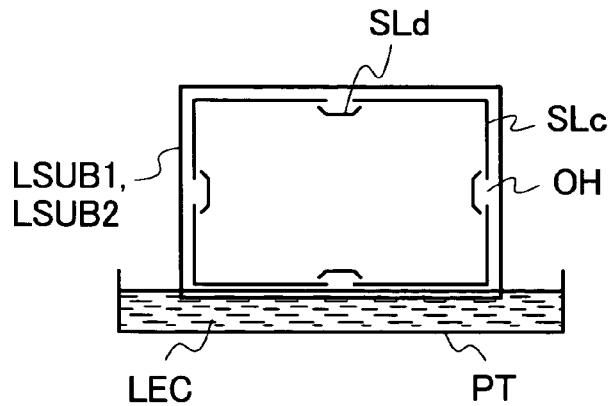

As shown in FIGS. 11A to 11C aspects of the present invention may include a method of sealing an opening formed in an outer peripheral sealing material which is formed in large-sized boards LSUB1, LSUB2 in a stage of preparing the multipiece boards.

As shown in FIG. 11A according to aspects of the present invention, large-sized boards LSUB1, LSUB2, which may be fixed to each other by the sealing member in an opposed manner, are prepared. In such aspects, large-sized boards LSUB1, LSUB2 may have a size of 450 mm×350 mm, for example.

In further aspects, large-sized boards LSUB1, LSUB2 may be (although not shown in FIG. 11A) formed such that plurality of individual sealing materials SLe—which is formed by surrounding the individual liquid crystal cells which are obtained by separation later—is formed adjacent to each other.

In such aspects, individual sealing material SLe may be a sealing material which is provided with a liquid crystal sealing port (as shown in FIG. 1 according to aspects of the present invention) or a sealing material which is not provided with a liquid crystal sealing port (as shown in FIG. 5 according to aspects of the present invention).

In such aspects, outer peripheral sealing material SLc may be formed such that outer peripheral sealing material SLc surrounds respective individual sealing materials SLe, while opening portion OH is formed at the approximate centers of portions formed in outer peripheral sealing material SLc respectively formed along four sides of large-sized boards LSUB1, LSUB2. In further aspects, above-mentioned weir sealing material SLd may be formed in the vicinity of opening portion OH formed in outer peripheral sealing material SLc.

Figure 14:
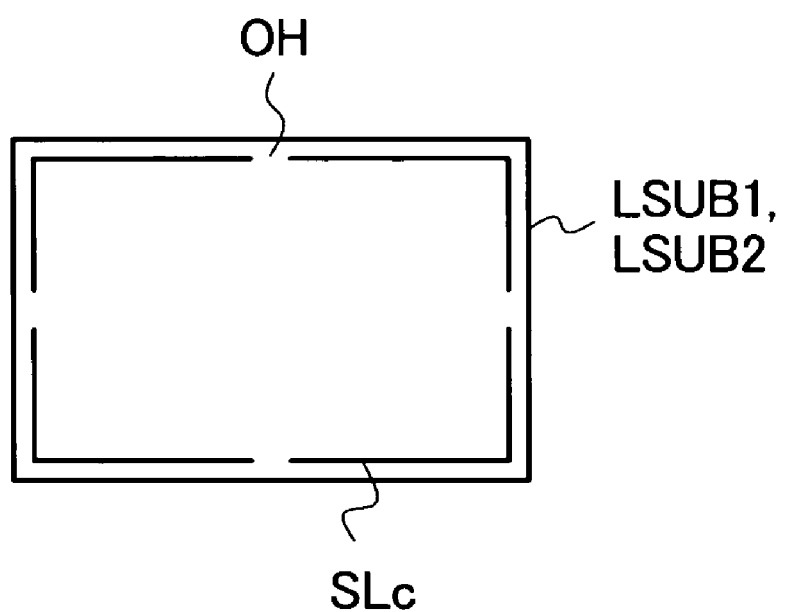
FIG. 14 is a step view showing another embodiment of the manufacturing method of the liquid crystal display device according to aspects of the present invention.

In further aspects, the sealing method of outer peripheral sealing material SLc is, as shown in FIG. 14 according to aspects of the present invention, for example, also applicable to large-sized boards LSUB1, LSUB2 in which weir sealing material SLd is not formed in the vicinity of opening portion OH formed in outer peripheral sealing material SLc.

In further aspects, container PT filled with sealant LEC may be provided, and sealant LEC may be made of a resin material which is cured by applying ultraviolet rays (for example, 3000 mj) In further aspects, viscosity of sealant LEC before curing may fall within a range of, for example, 125 to 840 mPa·s. In further aspects, viscosity which is extremely small compared to viscosity of a usual resin material may be selected.

A sealant having such viscosity may be used to seal opening portion OH formed in outer peripheral sealing material SLc by using capillary action.

In further aspects, when a sealant having viscosity higher than viscosity of sealant LEC is used, an amount of sealant for closing opening portion OH becomes small. In such aspects, a solution (hydrofluoric acid or the like) in chemical polishing may intrude into a space inside outer peripheral sealing material SLc through opening portion OH.

As shown in FIG. 11B according to aspects of the present invention, one side of large-sized boards LSUB1, LSUB2 may be immersed in the free surface of sealant LEC. In such aspects, this may allow sealant LEC to intrude into an opposing space formed of a small gap between large-sized board LSUB1 and large-sized board LSUB2 at the side by making use of the capillary phenomenon. In such aspects, when large-sized boards LSUB1, LSUB2 have the above-mentioned size, due to immersing of large-sized boards LSUB1, LSUB2 for approximately 10 minutes or less (for example), sealant LEC may intrude into opening portion OH formed in outer peripheral sealing material SLc at the above-mentioned one side of the large-sized boards LSUB1, LSUB2, which may close opening portion OH.

As shown in FIG. 11C according to aspects of the present invention, large-sized boards LSUB1, LSUB2 may be pulled up from container PT, end surfaces of large-sized boards LSUB1, LSUB2 at one side which are immersed in sealant LEC may be wiped with a wiping rug, for example, which may remove excessively adhered sealant LEC.

Figure 12A:
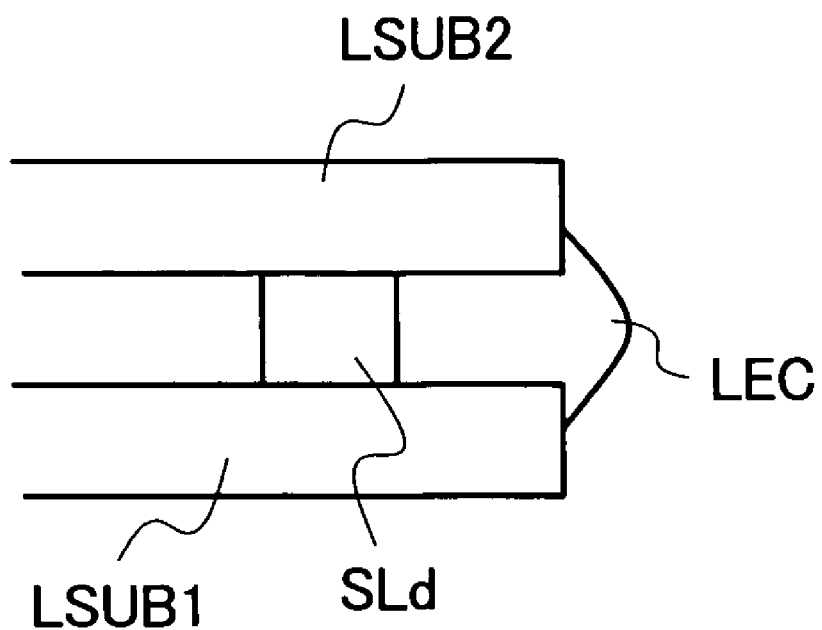
FIG. 12 is a cross-sectional view taken along a line XII-XII in FIG. 11C.
Figure 12B:
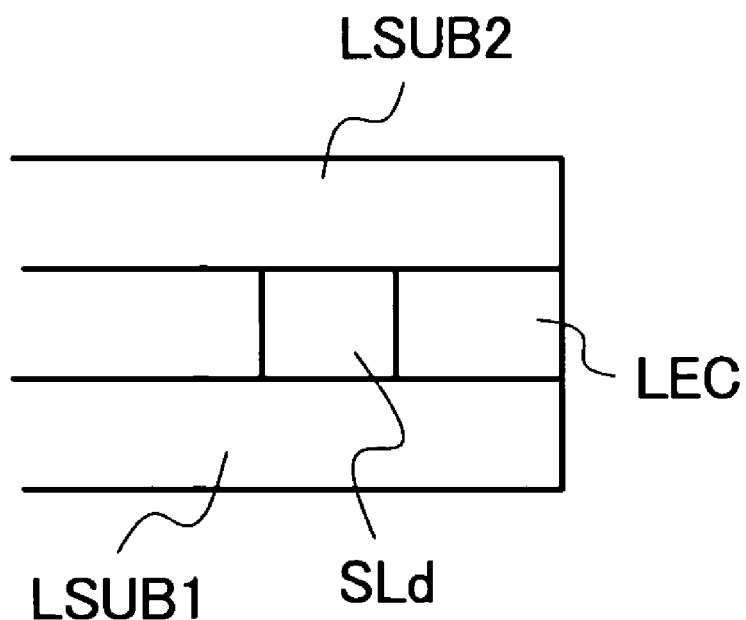

As shown in FIG. 12A, aspects of the present invention may include an adhering state of sealant LEC before wiping end surfaces of large-sized boards LSUB1, LSUB2 at one side. As shown in FIG. 12B, aspects of the present invention may include an adhering state of sealant LEC after wiping end surfaces of large-sized boards LSUB1, LSUB2 at one side. In further aspects, sealant LEC adhered to the end surfaces of large-sized boards LSUB1, LSUB2 at one side may be wiped so that sealant LEC remains in the gap between respective large-sized boards LSUB1, LSUB2. FIGS. 12A and 12B illustrate a cross section taken along a line XII-XII in FIG. 11C according to aspects of the present invention.

In further aspects, ultraviolet rays (for example, 3000 mj) may be radiated to sealant LEC, which may cure sealant LEC.

Figure 13:
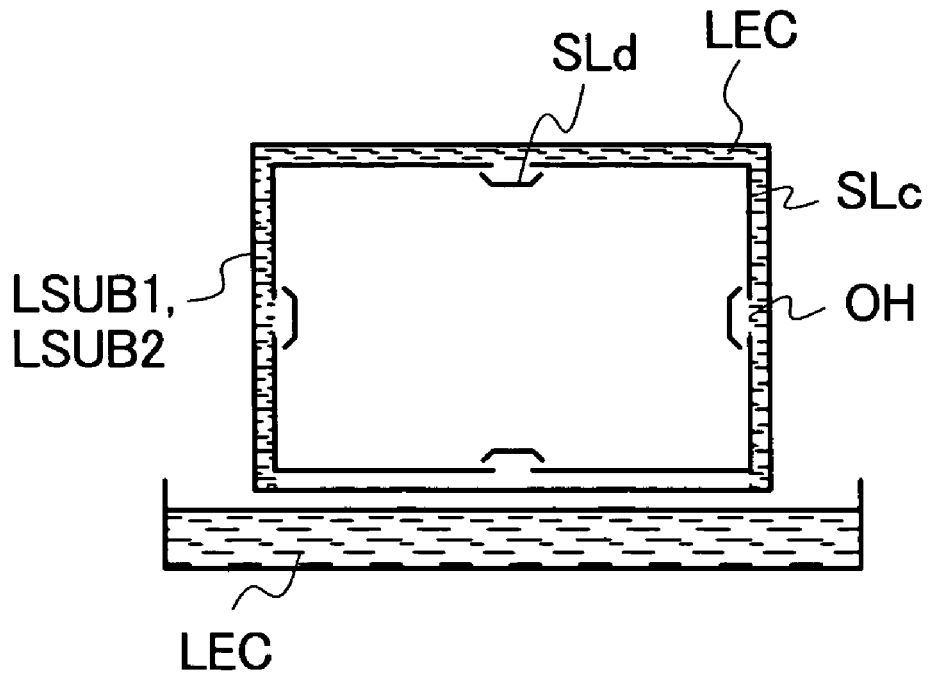
FIG. 13 is a view showing steps for manufacturing the liquid crystal display device after executing the steps shown in FIG. 11A to FIG. 11C.

In further aspects, the above-mentioned steps may be repeated in the same manner on remaining respective sides of large-sized boards LSUB1, LSUB2. As shown in FIG. 13, aspects of the present invention may include opening portion OH formed in outer peripheral sealing material SLc sealed on one remaining side. In further aspects, the respective steps shown in FIG. 11A to FIG. 11C may follow.

In further aspects, in the stage shown in FIG. 11B according to aspects of the present invention, sealant LEC may be sucked up into the small gap between large-sized boards LSUB1, LSUB2 by making use of a capillary phenomenon while lowering (cooling) a temperature of large-sized boards LSUB1, LSUB2. Such aspects may occur because sealing of opening portion OH formed in outer peripheral sealing material SLc by sealant LEC may be performed within a short time.

The above-mentioned respective embodiments may be used in a single form or in combination. This is because the advantageous effects of the respective embodiments can be acquired individually or synergistically.

Although illustrative embodiments have been shown and described herein in detail, it should be noted and will be appreciated by those skilled in the art that there may be numerous variations and other embodiments that may be equivalent to those explicitly shown and described. For example, the scope of the present invention is not necessarily limited in all cases to execution of the aforementioned steps in the order discussed. Unless otherwise specifically stated, terms and expressions have been used herein as terms of description, not of limitation. Accordingly, the invention is not to be limited by the specific illustrated and described embodiments (or the terms or expressions used to describe them) but only by the scope of claims.

What is claimed is:

1. A manufacturing method of a liquid crystal display device comprising the steps of:
   laminating two or more multipiece boards to each other by way of a sealing material;
   applying surface polishing to at least one of multipiece boards using an etchant; and
   separating the multipiece boards into respective liquid crystal cells by cutting,
      wherein the sealing material includes individual sealing materials which are formed for regions of the respective liquid crystal cells, and an outer peripheral sealing material which surrounds the respective individual sealing materials and forms an opening at least in a portion thereof, and
   the opening formed in the outer peripheral sealing material is sealed by sucking a sealant having viscosity before curing within a range from about 125 to about 840 mPa·s into a gap formed between the multipiece boards,
      wherein the opening formed in the outer peripheral sealing material is sealed using the sealant remaining after wiping out a surplus amount out of the sealant sucked into the gap formed between the multipiece boards.

2. A manufacturing method of a liquid crystal display device according to claim 1, wherein sucking of the sealant into the gap formed between the multipiece boards is performed while lowering a temperature of the multipiece boards.

3. A manufacturing method of a liquid crystal display device according to claim 1, wherein the separating step occurs after the surface polishing step.

4. A manufacturing method of a liquid crystal display device according to claim 1, wherein the surface polishing step occurs after the laminating step.

5. A manufacturing method of a liquid crystal display device according to claim 1, wherein the opening sealing step is performed before the surface polishing step.

* * * * *